US007526790B1

(12) United States Patent
Vesikivi

(10) Patent No.: US 7,526,790 B1
(45) Date of Patent: Apr. 28, 2009

(54) VIRTUAL AUDIO ARENA EFFECT FOR LIVE TV PRESENTATIONS: SYSTEM, METHODS AND PROGRAM PRODUCTS

(75) Inventor: Petri Vesikivi, Espoo (FI)

(73) Assignee: Nokia Corporation, Espoo (FI)

(*) Notice: Subject to any disclaimer, the term of this patent is extended or adjusted under 35 U.S.C. 154(b) by 1256 days.

(21) Appl. No.: 10/107,454

(22) Filed: Mar. 28, 2002

(51) Int. Cl.
*H04N 7/16* (2006.01)

(52) U.S. Cl. ........................................ 725/135; 725/59

(58) Field of Classification Search ................. 725/135, 725/138; 455/447; 348/738
See application file for complete search history.

(56) References Cited

U.S. PATENT DOCUMENTS

| | | | | | |
|---|---|---|---|---|---|
| 4,384,362 | A | * | 5/1983 | Leland | 455/447 |
| 5,495,576 | A | | 2/1996 | Ritchey | 395/125 |
| 5,555,306 | A | * | 9/1996 | Gerzon | 381/63 |
| 5,677,728 | A | * | 10/1997 | Schoolman | 348/14.15 |
| 5,894,320 | A | * | 4/1999 | Vancelette | 725/138 |
| 5,912,700 | A | | 6/1999 | Honey et al. | 348/157 |
| 6,154,250 | A | | 11/2000 | Honey et al. | 348/157 |
| 6,195,680 | B1 | | 2/2001 | Goldszmidt | 709/203 |
| 6,229,899 | B1 | | 5/2001 | Norris et al. | 381/77 |
| 6,301,339 | B1 | | 10/2001 | Staples et al. | 379/93.01 |

FOREIGN PATENT DOCUMENTS

| | | |
|---|---|---|
| WO | WO 99/21164 | 4/1999 |
| WO | WO 99/57900 | 11/1999 |
| WO | WO 01/52526 A2 | 7/2001 |

* cited by examiner

*Primary Examiner*—John W Miller
*Assistant Examiner*—Oschta Montoya
(74) *Attorney, Agent, or Firm*—Locke Lord Bissell & Liddell

(57) ABSTRACT

Audio sensors are located in different parts of an arena and are connected to a server by a wireless or wire connection. The sensors are equipped for reception and transmission of audio sounds for selected locations in the arena. The server provides a frequency divided carrier to the respective sensors. The audio sensors are capable of modulating the carrier frequency as a stereophonic sound in the area of the sensor. The server receives, digitizes, and packetizes the stereophonic sensor signals into a plurality of digital streams, each representative of a sensor location in the arena. The audio streams are combined with the video of an event using digital video broadcasting or via a cable system. The viewers are equipped with a control device linked to a TV for a selection of an audio stream by energizing an icon indicative of an audio stream representative of a position in the arena.

27 Claims, 4 Drawing Sheets

Virtual Audio Arena

VIRTUAL AUDIO ARENA EFFECT FOR LIVE TV PRESENTATIONS: SYSTEM, METHODS AND PROGRAM PRODUCTS

BACKGROUND OF THE INVENTION

1. Field of Invention

This invention relates to audio systems for TV presentations. More particularly, the invention relates to audio systems providing a virtual audio arena effect for live TV presentations.

2. Description of Prior Art

Today attendance at sporting, social and cultural events held in arenas, auditoriums and concert halls can be expensive and present travel difficulties, provided tickets are available for the event. Many events are covered by live TV broadcasts, which fail to give the viewer, the impression of being virtually present at the event. Enhancing the audio accompanying the TV presentation could contribute to providing a viewer with the impression of being virtually present at an event. Moreover, the impression could be further enhanced if the viewer could remotely control the origination of the audio in the arena to provide the viewer with the sensation of sitting in his/her favorite seat and, if desired, repositioning his/her seat for a better location in the arena, auditorium or concert hall.

Prior art related, virtual sound systems accompanying TV broadcast include:

(A) international Publication WO 01/52526 A2, entitled, "System and Method for Real Time Video Production and Multi-Casting", published Jul. 19, 2001, "discloses a method for broadcasting a show in a video production environment having a processing server in communication with one or more clients. The processor server receives requests from clients for one or more show segments. The server assembles the show segments to produce a single video clip and sends the video clip as a whole unit to the requested client. The video clip is buffered at the requesting client, whereby the buffering permits the requested client to continue to display the video clip.

(B) International Publication No. WO99/21164, published Apr. 29, 1999, entitled, "A Method in a System for Processing a Virtual Acoustic Environment", discloses a system intended to transfer a virtual environment as a datastream into a receiver and/or reproducing device. The datastream is stored in a memory in which there is stored a type or types of filters, a transfer function used by the system and creating a virtual environment. The receiver receives in the datastream parameters, which are used for modeling the surfaces within the virtual environment. With the aid of these data and stored filter types and transfer functions, the receiver creates a filter bank, which corresponds to the acoustic characteristics of the environment to be created. During operation, receiver receives the datastream, which is supplied to the filter bank created by the receiver and as a result a process sound lets the user listening to the sound receive an impression of the desired virtual environment.

(C) International Publication WO99/57900, published Nov. 11, 1999, entitled, "Video Phone with Enhanced User-Defined Imaging System", discloses a video phone, which allows a presentation of a scene composed of a user plus environment plus composed of a scene (composed of user plus environment) to be perceived by a viewer. An imaging system perceived the user scene extracts essential information describing the user's sensory appearance along with that of the environment. A distribution system transmits this information from the user's locale to the viewer's locale. A presentation system uses the essential information and the formatting information to construct a presentation of the scene's appearance for the viewer to perceive. A library of presentation/construction formatting may be employed to contribute information that is used along with abstracted essential information to create the presentation for the viewer.

(D) U.S. Pat. No. 5,495,576, issued Feb. 27, 1996, entitled, "Panoramic Image-Based Virtual Realty/Telepresence Audio-Visual System and Method", discloses a display system for virtual interaction with recorded images. A plurality of positionable sensor means of mutually angular relation, enables substantially continuous coverage of a three-dimensional subject. The sensor recorder communicates with the sensor and is operative to store and generate sensor signals representing the subject. A signal processing means communicates with a sensor and recorder. The processor receives the sensor signals from the recorder and is operable to textual map virtual images represented by the signal's sensor signals on to a three-dimensional form. A panoramic audio-visual display assembly communicates with the signal processor and enables display to the viewer of a texture map virtual image. The viewer has control means communicating with a single processor and enabling interactive manipulation of the texture map virtual images by the viewer by operating the interactive input device. A host computer manipulates a computer generated world model by assigning actions to subjects in the computer generated world model based upon actions by another subject in the computer generated world model.

None of the prior art discloses a viewer controlled audio system for enhancing a "live" TV broadcast of an event at an arena, auditorium or concert hall, the system providing the viewer with an audio effect of being virtually present at the event in a seat of his or her choice, which may be changed to another location, according to the desires of the viewer.

SUMMARY OF THE INVENTION

A TV viewer has enhanced listening of a sporting event, concert, or the like by the availability of audio streams from different positions in the arena. Audio sensors are located in different parts of the arena and are connected to a server by wireless or wired connection(s). The sensors are equipped for reception and transmission of sounds from the different positions. The server provides a frequency divided carrier to the respective sensors. The sensors are capable of modulating the divided carrier frequency with the audio sounds from the different positions as a stereophonic signal in the area of the sensor. The server receives, digitizes and packetizes the stereophonic sensor signal into a plurality of digital streams, each representative of the different sensor locations in the arena. The audio streams are broadcast to the viewer using Digital Video Broadcasting or via a cable system. The viewer is equipped with a control device airlinked to the TV for selection of an audio stream representative of a position in the arena. The selected digital stream is converted into an audio sound, which provides the viewer with a virtual presence at a selected position the arena. The viewer can change audio streams and select other positions in the arena from which to watch and listen to the audio sound being generated at the position.

A medium comprising program instructions executable in a computer system, provides the virtual arena effect for live TV presentations of an event.

DESCRIPTION OF THE DRAWINGS

The invention will be further understood from the following detailed description of a preferred embodiment, taken in conjunction with an appended drawing, in which.

DETAILED DESCRIPTION OF PREFERRED EMBODIMENT

Figure 1:
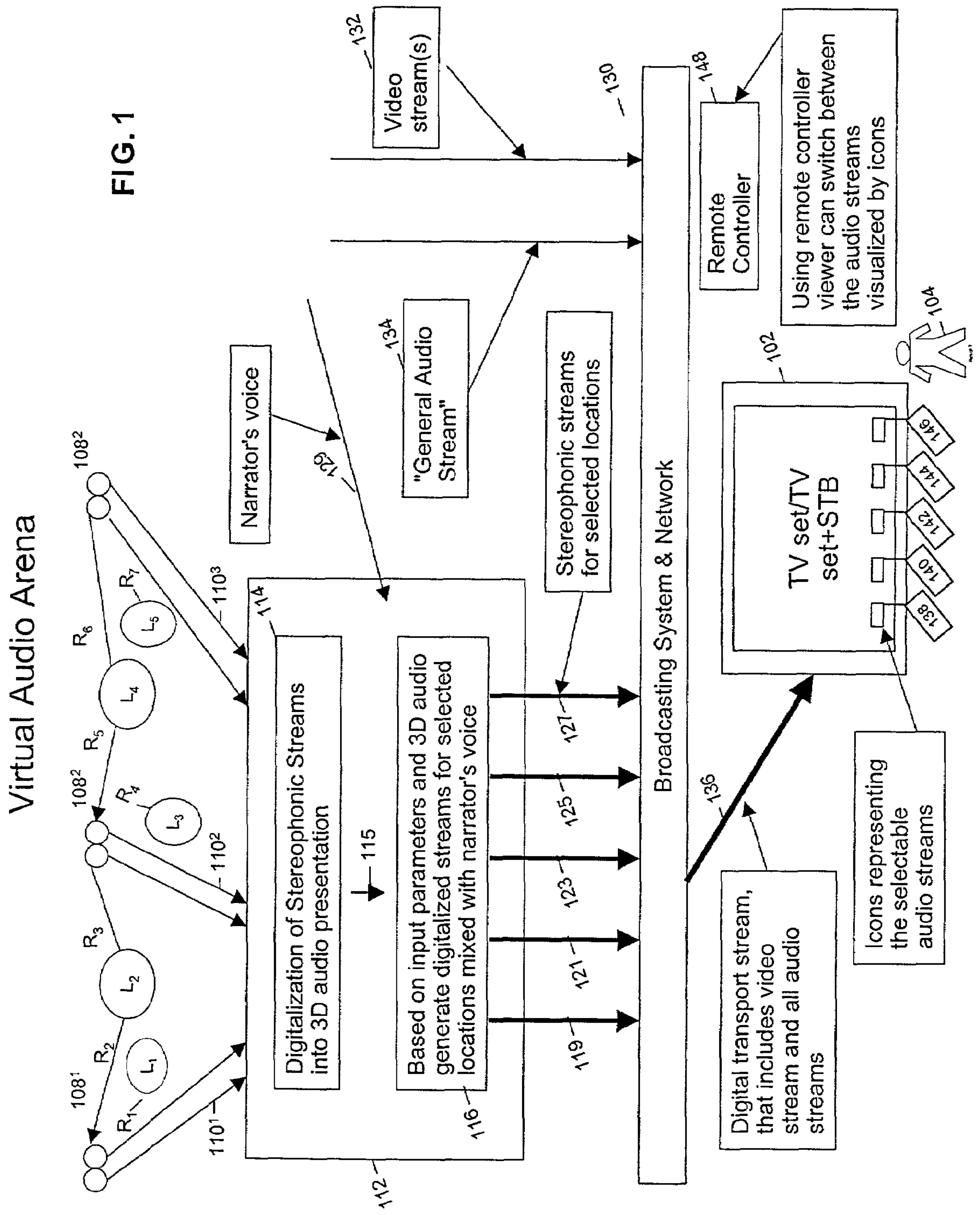
FIG. 1 is a representation of an audio system enhancing a "live" TV presentation of an event by providing a viewer with an impression of virtual presence at selected locations at the event, and incorporating the principles of the present invention.

FIG. 1 shows a system 100 for enhanced listening of a real-time event displayed oil a TV set 102 including a set top box for a viewer 104, where the event is performed in an arena, auditorium, concert hall or the like 106. The system enables the viewer to select his/her listening position(s) in the arena to obtain the impression of being virtually present in the arena at his/her preferred seating location with the further ability to change positions in the arena. To achieve this viewer impression, a series of stereophonic audio sensors 108$^1$, 108$^2$ . . . 108$^n$ are positioned about the arena to collect sounds associated with selected locations $L_1$, $L_2$, . . . L5, the number of sensors being arbitrary for the event being performed in the arena. The sensors are energized from a power supply (not shown) and provide stereophonic streams 110$^1$, 110$^2$ . . . 110$^n$ a server 112 for the selected locations $L_1$, $L_2$, . . . L5. The stereophonic streams are digitized and compressed in a software program 114 using an algorithm, for example, Motion Pictures Expert Group) (MPEG 2), published by the International Standards Organization/IEC and described in the text *MPEG-2* by J. Watkinisol, Focal Press, Woburn, Mass., 1999, Chapter 4 (ISBN 0 240 51510 2), and fully incorporated herein by reference. The digitized and compressed signals are provided as a serialized stream 115 to a signal processing circuit 116 for generation into digitized streams 119, 121, 123, 125, 127, as will be described in FIG. 3, for the locations $L_1$, $L_2$, . . . $L_5$, respectively. The digitized and compressed streams for the locations are mixed with a narrator's voice 129, describing the event for the display on the TV set 102. The number of selected locations may be increased or decreased and will vary with the number of audio sensors stationed in the arena.

A broadcasting system and network 130 receives the streams 119, 121, 123, 125, 127 and combines them with a video stream 132 of the "live" event and a general audio stream 134 for broadcast 136 by air, cable, wire, satellite or the like to the TV set 102. The audio streams are represented on the TV as icons 138, 140, 142, 144, 146 each representative of the locations $L_1$, $L_2$, . . . $L_5$, respectively which the viewer 104, using a remote controller 148 can switch among the audio streams visualized by the icons.

Figure 2:
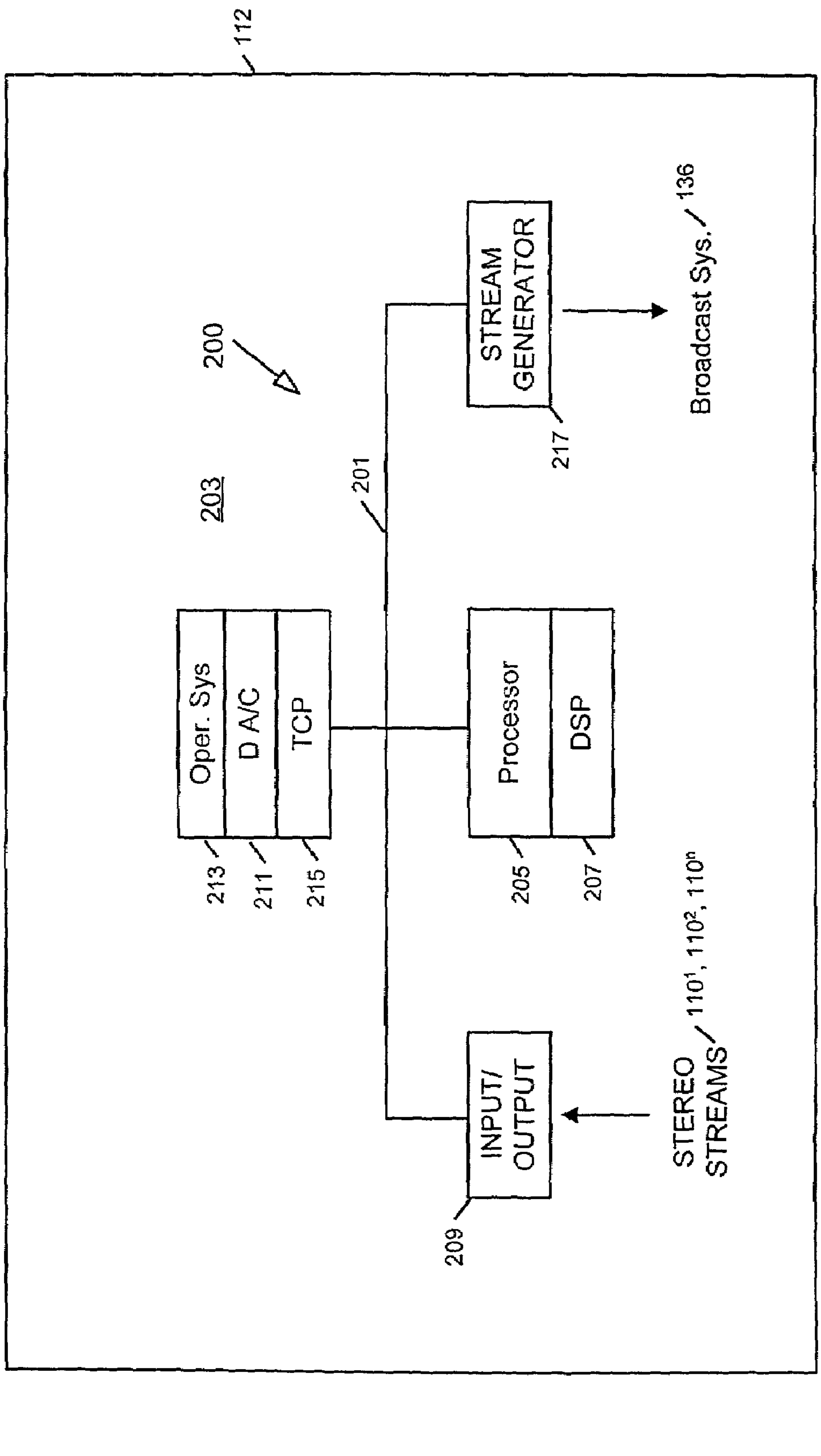
FIG. 2 is a representation of a server in the system of FIG. 1 for digitizing audio signals received from sensors at selected locations in the audio system and generating digitized streams mixed with a narrator's voice for the selected locations.

FIG. 2 describes the server 112 in more detail. The server comprises a computer system 200, including an industry standard architecture (ISA) bus 201 connecting together a volatile memory 203 to a processor 205, including a digital signal processor (DSP) 207, and an input/output device 211. The device 211 transmits a carrier signal to each sensor device for modulation by collected sounds and return to the device 211 as stereophonic signals 110$^1$, 110$^2$ . . . 110*n*' each stereophonic signal representative of the sounds a spectator would experience at a selected location in the arena. The returned stereophonic signals are provided to the DSP 207 for processing into a serialized string of packetized, digitized signals using a conventional signal processing program 211 stored in the memory 203. The DSP provides numerical values indicative of the signal amplitudes of the sampled audio streams 110$^1$, 110$^2$ . . . 110$^n$. The program 211 runs under the control of the processor 205 executing a standard operating system 213. The serialized streams 110$^1$, 110$^2$, 110$^n$ after packetization are framed for transmission using a Transaction Control Program (TCP) 215 running under the control of the processor 205. The details of packetization and transport streams are described in the text MPEG-2, Chapter 6, supra. The packetized, serialized streams are provided to a signal generator 217 for generating audio streams 119, 121, 123, 125, 127 representative of the audio at the locations $L_1$, $L_2$, . . . L5, respectively, as will be described in Conjunction with FIG. 3. The audio streams 119, 121, 123, 125, 127 are provided to the broadcast system and network 130 for transmission to the TV set 102 (see FIG. 1).

Figure 3:
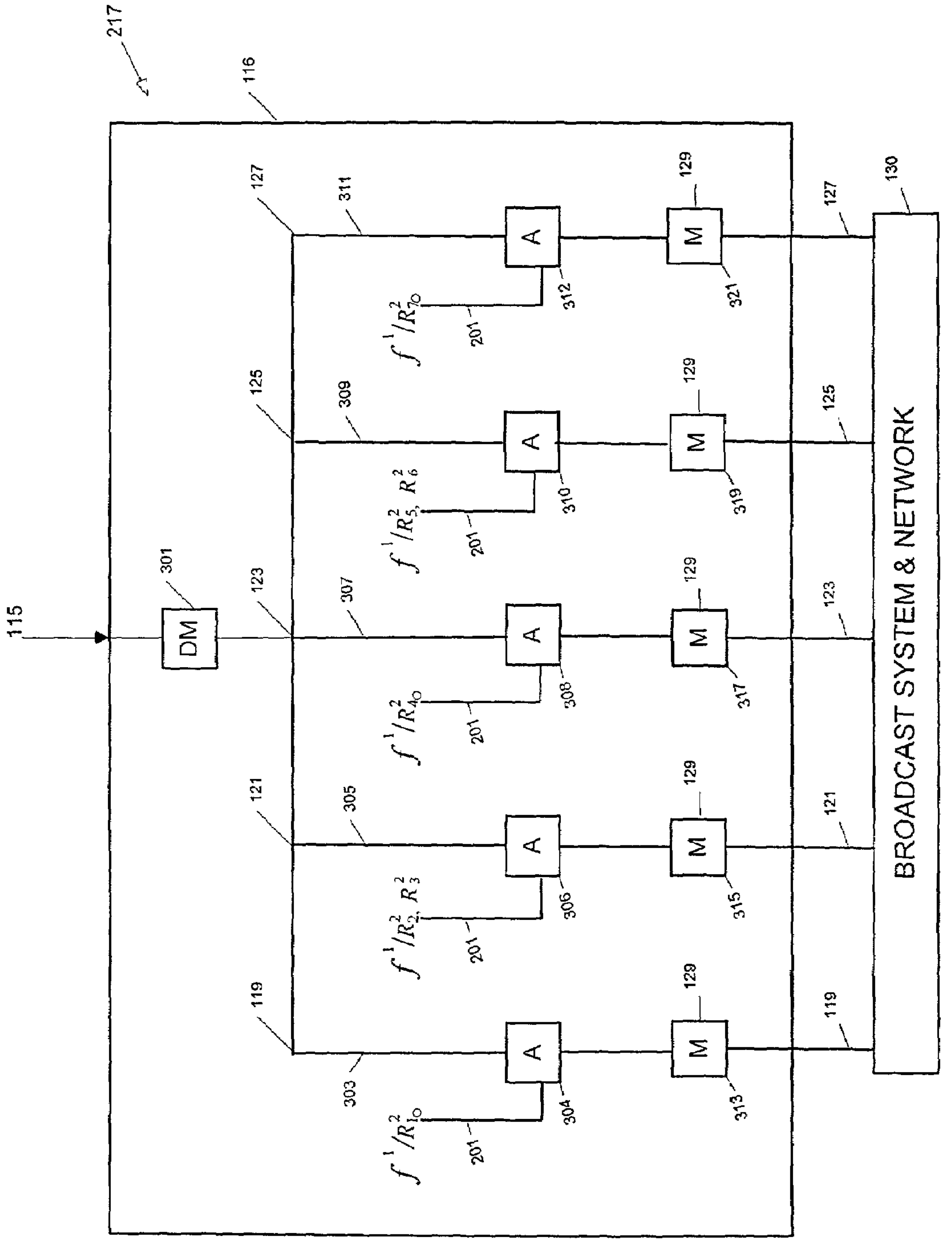
FIG. 3 is a representation of a signal processing circuit in FIG. 2 for generating the digitized streams for the selected locations.

FIG. 3 shows the details of the signal generator 217 included in the server 112 for processing the serialized stream of digitized stereophonic signals 115 received from the computer system 200 for conversion into digitized audio streams 119, 121, 123, 125, 127 representative of the locations 121, 123, 125, 127, respectively. The generator 217 includes a demultiplexer 301 for separation of the serialized stream 115 into separate digitized streams 119, 121, 123, 125, 127 representative of the sound a spectator would experience at the locations, $L_1$, $L_2$, . . . L5 respectively. It is well known that signal power diminishes between a transmitter and a receiver by $1/R^2$, where R is the distance between the transmitter and the receiver. The diminished signal power is known as the Rayleigh fading effect, described in the text *Newton's Telecom Dictionary*, by H. Newton, published by CMP Books, Gilroy, Ca, July 2000, page 732 (ISBN 1 57820 053 9). The R distances for each of the streams are stored in the non-volatile memory 203 (FIG. 1). The processor 205 provides a numerical value based on the R distance of each location for addition to the numerical value of each signal amplitude determined by the DSP in processing the audio streams 1101, 110$^2$, 110$^n$, as described in FIG. 2. Each location digital stream is amplified by amplifier 304, 306, 308, 310 and 312, respectively, and receives an input from the processor 205 over the bus 201 to compensate for the loss in sound due to the distance between the location and the sensor. Thus, the actual sound at the location $L_1$ would be compensated for by adding back into the signal 119, a value $1/R_1^2$, representative of the distance between the location and the sensor. The signal value for the location L2 would be increased in the amplifier 306 by a function of $1/R_2^2+1/R_3^2$, for distances between the location L2 and the sensors 108$^1$ and 108$^2$. The amplifier 308 would increase the packet value for the signal level at location L3 by a function of $1/R_4^2$. The signal level for location L4 would be increased in the amplifier 310 by a function of $1/R_5^2+1/R_6^2$. Finally, the signal level for the location L5 would be increased in the amplifier 312 by a function of $1/R_7^2$ to compensate for the signal loss between the location L5 and the sensor 108$^n$. The output of the amplifiers 304 . . . 312 are provided to conventional mixers 313, 315 . . . 321, respectively for adding the packetized narrator's voice 129 into the audio streams 119, 121, 123, 125, 127 for delivery to the broadcasting system and network 130 under control of the processor 205 using the TCP protocol.

Returning to FIG. 1, the broadcasting system 130 includes a video 132 and a general audio stream 136 in the transport stream 136 for transmission to the TV set 102 by air, cable, satellite or the like. Each digitized audio stream is recognized by the TV set and stored in a buffer (not shown) and generates icons 138, 140, 142, 144, and 146 each representative of location $L_1$, $L_2$, . . . L5, respectively. When the icon is energized by an infrared flash from a remote controller 148 operated by the viewer 104, the TV audio switches to the audio stream for the selected icon representative of a location in the arena. Thus, a viewer sitting in a remote location from the arena, can select a location in the arena, via the remote controller, to listen to the sound for the arena location identified by the icon and receive the effect of being present in the arena at the location selected by the viewer. Moreover, the viewer is able to move about the arena and listen to the sound originating from other selected locations.

Figure 4:
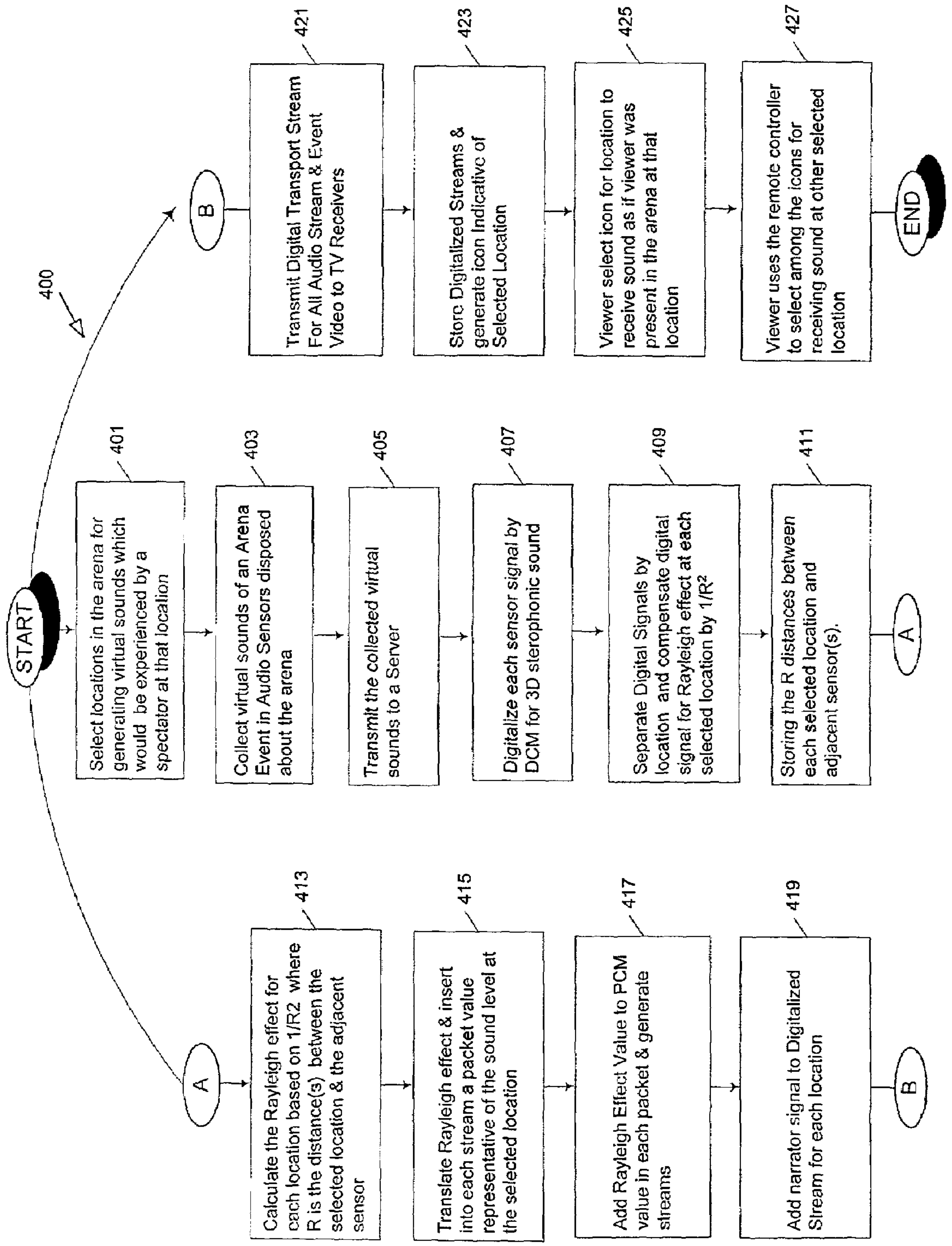
FIG. 4 is a flow diagram for processing audio sounds at selected locations in an arena into data streams for a "live" TV presentation where the location may be selected by the viewer using a TV control device.

FIG. 4 describes a process 400 for generating digitized streams representative of sounds a spectator would experience if present at a selected location in an arena.

Step 401 selects locations in the arena among installed audio sensors for generating virtual sounds, which would be experienced by the spectator at the selected locations.

Step 403 collects stereophonic sounds of an arena event in the audio sensors disposed about the arena.

Step 405 transmits the collected stereophonic sounds using a digital signal processor in a server.

Step 407 digitizes each sensor signal into a pulse code modulation (PCM) value for each stereophonic sound using a processor and standard MPEG programming.

Step 409 separates the digital signals in the server by arena location and compensates each digital signal for signal loss due to the Rayleigh effect between adjacent sensors and the selected locations in the arena.

Step 411 stores the distances R between viewer selected locations and adjacent sensor(s).

Step 413 calculates the Raleigh effect for each selected location based on $1/R^2$, where R is the distance(s) between the selected location and the adjacent sensor(s).

Step 415 translates the Rayleigh effect value for each location into a PCM value representative of the sound loss between each selected location and adjacent sensors.

Step 417 adds the Rayleigh effect value to the PCM value in each packet and generates packetized, digitized stream for each selected location in the arena.

Step 419 packetizes and adds the event narrator's voice signal to the digitized stream for each location.

Step 421 transmits all audio streams and the event video to TV receivers.

Step 423 stores the digitized streams in the receiver and generate an icon for each stream, the icon indicating the origin of the selected stream in the arena.

Step 425 viewer operates a remote TV controller under control of the viewer to select an icon of a location in the arena to receive the sound as if the viewer was present in the arena at the selected location.

Step 427 viewer operates the remote controller under control of the viewer to select other icons to receive the sound for other locations in the arena providing the viewer with the effect of moving about the arena.

While the invention has been shown and described in conjunction with a preferred embodiment, various changes can be made without departing from the spirit and scope of the invention as defined in the appended claims.

I claim:

1. Apparatus, comprising:

first stereophonic audio sensors located at a first sensor location in an arena to receive ambient sounds during an interval and produce a first stereophonic stream;

second stereophonic audio sensors located at a second sensor location in the arena to receive ambient sounds during the interval and produce a second stereophonic stream;

a virtual listening location selected in the arena at a first distance from the first stereophonic audio sensors and a second distance from the second stereophonic audio sensors;

calculating a numerical value representative of signal power fading between the audio sensor locations and a selected location;

a server coupled to the first and second sensors, for adding to signal values of the first and second stereophonic streams, a compensating signal based on the numerical value for the first and second distances to the virtual listening location, to produce an audio stream representative of audio that a listener would hear during the interval if-located at the virtual listening location in the arena;

said server outputting said audio stream and additional audio streams as a plurality of audio streams representative of audio that a listener would hear during the interval if the listener was respectively located at any one of a corresponding plurality of virtual listening locations in the arena; and a transmitter for broadcasting the plurality of audio streams accompanied by a video stream depicting a scene of the arena during the interval;

said plurality of audio streams capable of being individually recognized at television receivers receiving the broadcast and displayed with respective selection icons enabling a listener to play respective ones of the plurality of audio streams to hear audio that the listener would hear during the interval if the listener was respectively located at any one of the corresponding plurality virtual listening locations in the arena.

2. The audio system of claim 1 wherein the server comprises:

an input/output device coupled to the server for providing a carrier signal to each sensor, the device receiving a modulated audio signal from the sensor.

3. The system of claim 2 further comprising:

a digital signal processor for processing the modulated audio signals into a serialized stream of digitized signals representative of the collected sounds at selected locations in the arena.

4. The system of claim 3 further comprising:

a processor using a transport protocol for packetizing the serialized streams.

5. The system of claim 3 further comprising:

a stream generator receiving and demultiplexing the packetized, serialized streams into separate streams, each stream representative of the audio signal generated by the sensor for selected locations in the arena.

6. The system of claim 1 further comprising:

amplifier apparatus which compensates each stream for a Rayleigh effect experienced by the sensors.

7. The system of claim 5 further comprising:

mixer apparatus which incorporates a packetized representation of a narrator's voice for the event in each stream.

8. The system of claim 5 further comprising:

a broadcast system for receiving the separate streams and combining them with video signal representative of a live event in the arena for transmission to TV receivers.

9. The system of claim 8 further comprising:

storing apparatus in the TV receivers which stores the individual streams for processing by the TV receivers.

10. The system of claim 9 further comprising:

icon generating apparatus which generates an icon representative of each stored stream.

11. The system of claim 1 further comprising:

remote control apparatus which energizes an icon to select a stream representative of the sound at a selected location in the arena and providing a viewer with a virtual arena effect for a live TV presentation.

12. A method, comprising:

selectively positioning a plurality of audio sensors in an arena to capture sounds and generate audio signals representative of the sounds at selected locations for an event in the arena;

linking a server to the audio sensors for receiving the audio signals;

digitizing and packetizing the audio signals from the sensors;

calculating a numerical value representative of signal power fading between the audio sensor locations and a selected location;

adding to the audio signal a compensating signal based on the numerical value to produce an audio stream that a listener would hear if located at the selected location;

generating individual digitized, packetized streams representative of the sounds received at the selected locations in the arena;

receiving the individual streams and combining them with a video signal of the event in the arena;

transmitting the streams and the video signal to a TV receiver as a live event, each stream representative of a location in the arena; and selecting a stream representative of a location in the arena, the stream providing a viewer with a virtual arena effect for a live TV presentation t of the event.

13. The method of claim 12 further comprising:

providing a carrier signal to each sensor, and in response, receiving a modulated audio signal from the sensor.

14. The method of claim 13 further comprising:

processing the modulated audio signals into a serialized stream of digitized signals representative of the collected sounds at selected locations in the arena.

15. The method of claim 14 further comprising:

packetizing the serialized streams using a transport protocol.

16. The method of claim 14 further comprising:

receiving and demultiplexing the packetized, serialized streams into separate streams, each stream representative of the audio signal generated by the sensor for selected locations in the arena.

17. The method of claim 12 further comprising:

compensating each stream for a Rayleigh effect experienced by the sensors.

18. The method of claim 12 further comprising:

incorporating a packetized representation of a narrator's voice for the event in a stream.

19. The method of claim 12 further comprising:

receiving the individual streams and combining them with a video signal representative of the live event in the arena for transmission to TV receivers.

20. The method of claim 12 further comprising:

storing the individual streams for processing by the TV receiver.

21. The method of claim 20 further comprising:

generating an icon representative of each stored stream.

22. The method of claim 21 further comprising:

energizing an icon to select a stream representative of the sound at a selected location in the arena and providing a viewer with a virtual arena effect for the live TV presentation.

23. A computer readable storage medium containing stored program instructions, executable in a computer system, comprising:

program instructions for linking a server to a plurality of audio sensors in an arena that capture sounds and generate audio signals representative of sounds at selected locations for an event in the arena;

program instructions for digitizing and packetizing the audio signals from the sensors;

program instructions for generating individual digitized, packetized streams representative of the sounds received at selected locations in the arena;

program instruction for calculating a numerical value representative of signal power fading between the audio sensor locations and a selected location;

program instruction for adding to the audio signal a compensating signal based on the numerical value to produce an audio stream that a listener would hear if located at the selected location;

program instructions for receiving the individual streams and combining them with a video signal of the event in the arena; and program instructions for transmitting the streams and the video signal to TV receivers as a live event, each stream representative of a location in the arena whereby a viewer can elect a stream representative of a location in the arena, the stream providing the viewer with a virtual arena effect for a live TV presentation of the event.

24. The memory of claim 23 further comprising:

program instructions for providing a carrier signal to each sensor and in response receiving a modulated audio signal from the sensor.

25. The memory of claim 24 further comprising:

program instructions for processing the modulated audio signals into a serialized stream of digitized signals representative of collected sounds at selected locations in the arena.

26. A computer readable storage memory containing program instructions executable in a computer system, comprising:

program instructions for linking a server to a plurality of audio sensors in an arena that capture sounds and generate audio signals representative of sounds at selected locations for an event in the arena;

program instructions for digitizing and packetizing the audio signals from the sensors;

program instructions for calculating a numerical value representative of signal power fading between the audio sensor locations and a selected location;

program instructions for adding to the audio signal a compensating signal based on the numerical value to produce an audio stream that a listener would hear if located at the selected location;

program instructions for generating individual digitized, packetized audio signals representative of the sounds relating to events of the arena;

program instructions for receiving the individual audio signals and combining them with a video signal of the event in the arena; and program instructions for transmitting the audio signals and the video signal to TV receivers as a live event, each of the individual audio signals representative of a viewer's selected arena location, whereby the audio signals provide the viewer with a virtual arena effect for a live TV presentation of the event.

27. An audio system, comprising:

a plurality of audio sensors selectively positioned to capture sounds and generate audio signals representative of the sounds at selected locations for an event in an arena;

a server linked to the audio sensors for receiving the audio signals and configured for:

digitizing and packetizing the audio signals from the sensors;

calculating a numerical value representative of signal power fading between the audio sensor locations and a selected location;

adding to the audio signal a compensating signal based on the numerical value to produce an audio stream that a listener would hear if located at the selected location;

stream generating apparatus which generates individual digitized, packetized streams representative of the sounds received at selected locations in the arena;

a broadcast system receiving the individual streams and combining them with a video signal of the event in the arena, the system transmitting the streams and the video signal to TV receivers as a live event, each stream representative of a location in the arena; and control means at the TV receiver for selecting a stream representative of a location in the arena, the stream providing a viewer with a virtual arena sound effect for the live TV broadcast of the event.

* * * * *